Dec. 29, 1970     T. A. INSOLIO     3,550,273

LONG REACH HAND-HELD GLASS CUTTING TOOL

Filed May 16, 1968

INVENTOR.

THOMAS A. INSOLIO

BY

McCormick, Paulding & Huber

ATTORNEYS

United States Patent Office 3,550,273
Patented Dec. 29, 1970

---

3,550,273
LONG REACH HAND-HELD GLASS CUTTING TOOL
Thomas A. Insolio, Bristol, Conn., assignor to The Fletcher-Terry Company, Forestville, Conn., a corporation of Connecticut
Filed May 16, 1968, Ser. No. 729,760
Int. Cl. B26b 3/00, 25/00
U.S. Cl. 30—164.95                    5 Claims

ABSTRACT OF THE DISCLOSURE

An elongated handle carries a cutting head on a bifurcated end portion thereof. The head includes a depending support post pivotally mounted to the bifurcated end portion, and also includes a glass cutting wheel holder block pivotally mounted to the lower free end of the support post for limited lateral tilting movement about a fore and aft axis extending in the direction of movement of the cutting wheel across the glass surface. The axis of rotation of the holder block is below the level of the straight edge used to guide the cutting head as it is drawn across the glass.

BACKGROUND OF THE INVENTION

Prior art methods of scoring very large sheets of glass have involved either one of two methods. The usual procedure is for the cutter to place the glass on a table and then to climb onto it and score along a straight edge with a standard hand cutter. This method is, of course, conducive to scratches and damaging of the glass. A second method has evolved wherein a standard hand cutter is mounted at the end of a long stick or rod and drawn over the glass while the user stands in front of the table. This latter method has been improved upon somewhat by rather rudimentary long reach cutters which attempt to maintain the cutting element in a particular orientation to the glass surface as the handle is drawn along against a straight edge. However, prior art designs have not proven too successful in maintaining the cutting element in a vertical position since the workman must attempt to do this while at the same time he must hold the tool against the straight edge and apply the required cutting pressure as he pulls the tool toward himself.

SUMMARY OF INVENTION

This invention relates to hand-held glass cutting tools, and deals more particularly with a long reach cutting tool for use on the end of an elongated handle.

A general object of the present invention is to provide a long reach hand-held glass cutting tool in which the cutting head is pivotally mounted to one end of an elongated handle in such a manner as to always cause the cutter itself to remain at right angles to the glass surface to be cut in spite of variations in the angular relationship between the handle and the glass surface.

Another general object of the present invention is to provide a long reach hand-held glass cutting tool of the foregoing character wherein the cutting head is adapted to be stabilized in position against a straight edge in spite of variations in the angular relationship between the handle and the guide surface of the straight edge located normal to the glass surface.

A more specific object of the present invention is to provide a long reach hand-held cutting tool of the foregoing character wherein the cutting head includes a rectangular holder block for the cutting element, which block is so mounted to the handle as to remain stabilized with its lower surface parallel the glass surface and with one side surface in engagement with the straight edge guide surface in spite of variations in the angular relationship between the handle and both the glass surface and the guide surface of the straight edge.

A still further specific object of the present invention is to provide a long reach hand-held glass cutting tool of the foregoing character wherein a cutting wheel is rotatably mounted at the bottom of the holder block, whereby to maintain the wheel in continuous vertical orientation with respect to the glass surface to be cut.

In keeping with the foregoing objects, the long reach hand-held glass cutting tool of the present invention is designed to maintain the cutting element or wheel vertically during the cutting operation and to facilitate holding the head against a straight edge by minimizing the criticality of the angles formed between the handle and the glass surface and between the handle and the guiding face of the straight edge.

DETAILED DESCRIPTION

Figure 1:
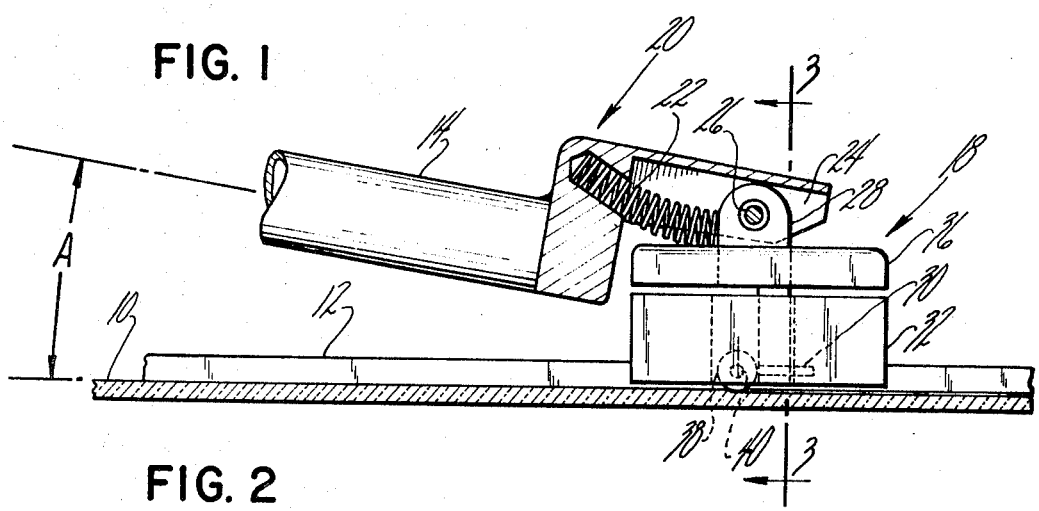
FIG. 1 is an elevational view showing the bifurcated end portion of the handle in vertical section, the handle being held at an angle A with respect to the surface of the glass to be scored.
Figure 2:
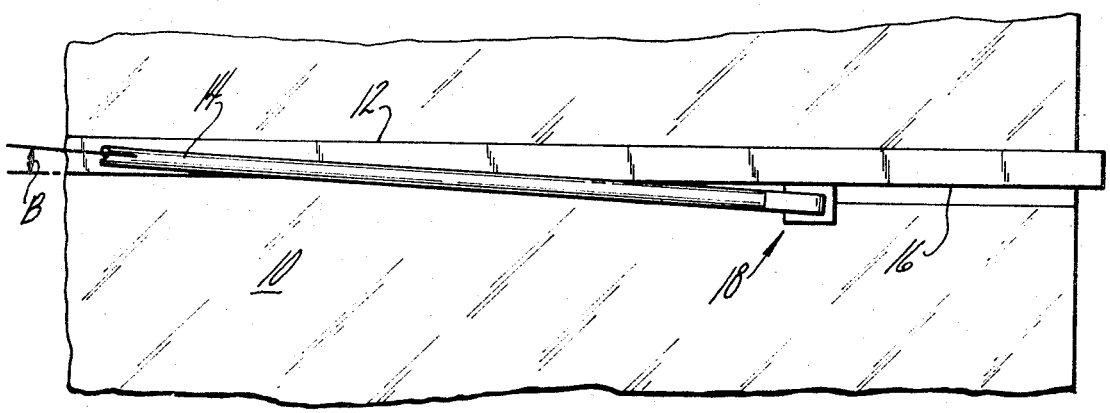
FIG. 2 is a plan view of the cutting tool shown in FIG. 1 illustrating the handle being held and an acute angle B with respect to the face of the straight edge which is normal to the glass surface.

Turning now to the drawing in greater detail, FIG. 1 shows a glass cutting tool constructed in accordance with the present invention for use in scoring a glass sheet 10 upon which a straight edge 12 has been placed for guiding the cutting tool as it is drawn across the surface of the glass by means of the elongated handle 14 held at an angle A to the glass surface. FIG. 2 shows the handle 14 held at an angle B with respect to a face 16 of the straight edge 12 which is normal to the glass surface. The cutting head, indicated generally at 18, is urged against the straight edge face 16 during the cutting operation.

The elongated handle 14 may be tubular as shown, and may be made in a plurality of sections so as to permit varying its length in order to score glass sheet of varying size. In accordance with the present invention, one end of the handle 14 carries an L-shaped bracket 20 having one leg which is attached to the end of the handle. An opening in this leg receives a spring 22, and the other leg of the L-shaped bracket extends forwardly from the handle 14 and defines depending furcations 24, 24 in which a pivot pin 26 is mounted for pendulously supporting the cutting head 18 to be described.

The cutting head 18 comprises a depending support post 28 pivotally mounted on the pin 26 for fore and aft pendulous movement about a lateral axis defined by the pivot pin 26. The lower end of the support post 28, best shown in FIG. 3, carries a longitudinally extending pivot pin 30, which pin extends forwardly from the support post 28 so as to pivotally support a generally rectangularly shaped cutting element holder block 32.

Figure 3:
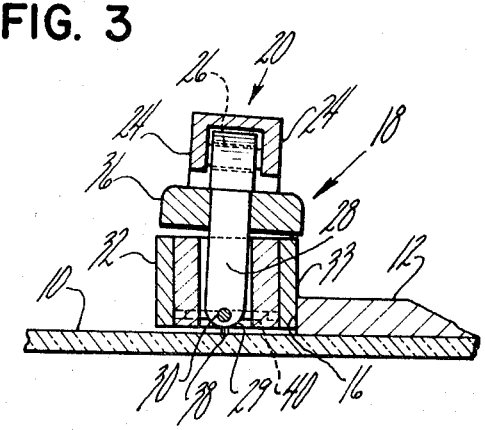
FIG. 3 is a vertical sectional view taken along the line 3—3 of FIG. 1.

Still with reference to FIG. 3, the block 32 has a central opening normal to its generally planar lower surface for loosely receiving the depending support post 28. Thus, the block 32 is pivotally mounted to the support post 28 adjacent its lower end 29 for limited lateral tilting movement about a longitudinal axis defined by the pivot pin 30. The rectangular block 32 has planar side surfaces such as the surface 33 which are adapted to engage the normal guide face 16 of the straight edge 12. The support post 28 is free to tilt slightly, as shown in FIG. 3, as the user holds the elongated handle 14 at an angle, such as indicated at B in FIG. 2, against the straight edge 12. In order to provide a further degree of freedom between the rectangular cutting block 32 and the handle 14, the laterally extending pivot pin 26 can be seen from FIG. 3 to be received in a laterally extending opening in the support post 28 which is of slightly larger diameter than the pin. This difference in size between the pin 26 and its opening in the support post 28 also provides for a slight variation in the angular position of the handle 14 with respect to the face 16 of the straight edge 12 as shown in FIG. 2 at B.

The support post 28 carries a cap portion intermediate its pivoted end and its lower end 29, and this cap portion 36 is of generally rectangular shape corresponding to that of the holder block 32. The cap portion 36 is so mounted with respect to the block 32 that the upper surface of said block is engageable with the underside of the cap portion to limit the lateral tilting movement thereof as illustrated in FIG. 3.

As best shown in FIG. 1, the glass cutting element provided in the holder block 32 preferably comprises a cutting wheel 38 rotatably supported on a lateral axis defined by a pivot pin 40, the ends of which pivot pin are received in openings provided for this purpose in the holder block 32. As so constructed and arranged, the generally planar lower surface of the holder block 32 tends to remain parallel with the glass surface 10 causing the cutter wheel 38 to remain vertically oriented with respect to this glass surface. Lateral tilting movement of the cutter block 32 is, of course, prevented by engagement between the normal guide face 16 of the straight edge 12 and the side surface 33 of the block as described above. Fore and aft or longitudinal tilting movement of the holder block 32 with respect to the glass surface 10 is substantially reduced as a result of the block 32 being quite long in comparison with the diameter of the cutting wheel 38, and also by providing or locating the axis of rotation of the cutter wheel 38, defined by the pin 40, just aft or rearwardly with respect to the lateral axis defined by the upper pivot pin 26. Although this configuration tends to produce a clockwise force couple or moment on the rectangular block 32, it is noted that the workman in drawing the tool across the surface of the glass exerts a horizontal force to the left in FIG. 1, which force cooperates with the drag exerted by the glass on the cutting wheel to provide a counterclockwise moment. In order to assure that these couples balance one another effectively so as to maintain the block 32, and more particularly its lower surface, in parallel relationship with the glass surface 10, the spring 22 is provided for exerting a counterclockwise moment on the block 32 indirectly as a result of acting on the cap portion 36 of the support post 28. From FIG. 1 it will be apparent that angle A can be reduced by lowering the handle 14 in closer relationship to the glass 10. As a result of decreasing the angle A, the coiled compression spring 22 will be deformed axially creating a slightly larger spring force. This spring force will tend to balance the clockwise moment resulting from decreasing the angle A.

It is an important feature of the present invention that the longitudinal axis defined by the pivot pin 30 is located no higher than the upper edge of the guide face 16 of the straight edge 12. As a result of this configuration, the user can exert a sideways force against the straight edge without fear of tilting the cutting head about the upper edge of the guide face 16 of the straight edge 12. As a result of this configuration the cutting wheel 38 is maintained in the desired vertical orientation with respect to the glass surface 10 to be scored.

I claim:

1. In combination a glass cutting tool, a straight edge adapted for placement on a glass surface to be cut and having a tool guiding face which is normal to the glass surface, said tool comprising an elongated handle adapted to being held at an acute angle with respect to said face and with respect to said glass surface, a depending support pivotally mounted to said handle for fore and aft pendulous movement about a lateral axis located above the straight edge face, a cutting element holder pivotally mounted to said depending support adjacent the free end of said support for limited lateral tilting movement about a longitudinal axis located adjacent the lower end of said support and below the upper marginal edge of said straight edge guiding face whereby said holder is stabilized in position against said straight edge face in spite of minor changes in the angle at which said handle is held as the tool is drawn along the straight edge.

2. The combination set forth in claim 1 wherein said holder comprises a rectangular block having at least one side for engagement with said straight edge face and having a generally planar lower surface, and a glass cutting element extending downwardly below said lower surface of said rectangular block.

3. The combination set forth in claim 2 wherein said holder block has a central opening normal to said lower surface for loosely receiving said depending support.

4. The combination set forth in claim 3 and further characterized by spring biasing means for urging said support forwardly to hold said holder and hence said cutting element in contact with said glass surface through a range of acute angles between said handle and said glass surface, said cutting element comprising a glass cutting wheel rotatably supported in said holder block on a pivot axis located rearwardly of said lateral axis about which said support pivots.

5. The combination set forth in claim 4 wherein said depending support includes a cap portion intermediate said pivoted end and said free end thereof, and said rectangularly shaped cutting element holder block having an upper surface which is engageable with the underside of said cap portion to limit the lateral tilting movement of said holder block.

References Cited

UNITED STATES PATENTS

| | | | |
|---|---|---|---|
| 2,516,668 | 7/1950 | Barrett | 30—164.95 |
| 2,893,033 | 7/1959 | Vosbikian | 306—19X |

THERON E. CONDON, Primary Examiner

R. V. PARKER, Jr., Assistant Examiner